United States Patent
Kiyose (10) Patent No.: US 7,221,909 B2
(45) Date of Patent: May 22, 2007

(54) METHOD FOR GUIDING WIRELESS COMMUNICATION DEVICE INTO COMMUNICABLE RANGE AND WIRELESS COMMUNICATION DEVICE

(75) Inventor: Katsumi Kiyose, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 539 days.

(21) Appl. No.: 10/395,152

(22) Filed: Mar. 25, 2003

(65) Prior Publication Data

US 2004/0048571 A1 Mar. 11, 2004

(30) Foreign Application Priority Data

Mar. 29, 2002 (JP) ............................. 2002-095243

(51) Int. Cl.
 *H04B 7/00* (2006.01)
(52) U.S. Cl. ............... 455/41.2; 455/456.1; 455/456.3; 455/456.6; 701/217; 701/224; 701/225; 342/357.01; 342/357.02; 342/357.03; 342/357.17; 342/450; 340/988; 340/992; 340/995.25; 340/995.28
(58) Field of Classification Search .. 455/456.1–456.6, 455/41.1–41.2; 701/217, 224, 225; 342/357.01–357.03, 342/357.17, 450, 458, 461; 340/988, 992, 340/995.25, 995.28
See application file for complete search history.

(56) References Cited

U.S. PATENT DOCUMENTS

| | | | | |
|---|---|---|---|---|
| 3,986,682 A | * | 10/1976 | Dryden | ....................... 244/3.17 |
| 5,243,528 A | * | 9/1993 | Lefebvre | ..................... 701/211 |
| 5,434,904 A | | 7/1995 | Tsuzuki et al. | |
| 5,502,758 A | | 3/1996 | Tsuzuki et al. | |
| 5,568,654 A | | 10/1996 | Fukawa | |
| 5,757,271 A | * | 5/1998 | Andrews | ................... 340/568.1 |
| 5,835,017 A | | 11/1998 | Ohkura et al. | |
| 5,873,041 A | | 2/1999 | Ishii | |
| 6,246,376 B1 | * | 6/2001 | Bork et al. | .................. 343/760 |
| 6,545,638 B2 | * | 4/2003 | Sladen | ................... 342/357.14 |
| 6,546,336 B1 | * | 4/2003 | Matsuoka et al. | ........... 701/213 |
| 6,700,533 B1 | * | 3/2004 | Werb et al. | ............. 342/357.07 |
| 6,868,256 B2 | | 3/2005 | Dooley et al. | |
| 6,987,986 B2 | * | 1/2006 | Boesen | ..................... 455/556.1 |
| 2002/0035554 A1 | * | 3/2002 | Katsuno et al. | ................ 706/17 |
| 2002/0094777 A1 | * | 7/2002 | Cannon et al. | ................ 455/41 |
| 2004/0246147 A1 | * | 12/2004 | von Grabe | ............. 340/995.13 |

FOREIGN PATENT DOCUMENTS

| | | |
|---|---|---|
| JP | A 8-19036 | 1/1996 |
| JP | A 8-168072 | 6/1996 |
| JP | A-10-260055 | 9/1998 |
| JP | A 10-289398 | 10/1998 |
| JP | A-11-220768 | 8/1999 |
| JP | A 2001-36320 | 2/2001 |
| JP | A 2001-56892 | 2/2001 |
| JP | A 2001-145162 | 5/2001 |
| JP | A-2004-509559 | 3/2004 |

* cited by examiner

*Primary Examiner*—Quochien B. Vuong
*Assistant Examiner*—Zhiyu Lu
(74) *Attorney, Agent, or Firm*—Oliff & Berridge, PLC (57) ABSTRACT

A personal digital assistant (PDA) detects its position by a two-axis acceleration sensor provided therein. While the PDA is within a communicable range where the PDA can communicate with the printer, a position of the PDA, which is located at time when the position of the PDA is detected, is recorded as an origin point and the origin point is periodically updated to the detected position. When the PDA moves to a position (current position) through a position which is out of the communicable range of the printer, guidance information for guiding the PDA into the communicable range of the printer is created based on a relative positional relationship between the current position and the origin point, which is recorded immediately before the PDA moves to a position out of the communicable range, and then the guidance information is displayed on the PDA.

20 Claims, 9 Drawing Sheets

FIG.3B DIRECTION AND DISTANCE

FIG.3A DIRECTION ONLY

METHOD FOR GUIDING WIRELESS COMMUNICATION DEVICE INTO COMMUNICABLE RANGE AND WIRELESS COMMUNICATION DEVICE

BACKGROUND OF THE INVENTION

1. Field of Invention

The invention relates to a method for guiding a wireless communication device into a communicable range where the wireless communication device can achieve data communication with a communication target, and a wireless communication device that creates information used to place the wireless communication device back within the communicable range when the wireless communication device moves to a position out of the communicable range, using the above-described method.

2. Description of Related Art

Recently, Bluetooth® wireless technology is becoming widely used as a wireless communication system for enabling short-range wireless data communication between various devices. For example, wireless data communication is implemented between stationary electronic devices, such as desktop personal computers, printers and scanners, between portable electronic devices, such as cellular phones, PDAs (personal digital assistants) and notebook computers, or between the above-described stationary electronic devices and the above-described portable electronic devices.

The Bluetooth® wireless technology can carry out communication within a relatively short range (approximately between 10 to 100 meters in one-to-one communication) at low power consumption and a middle speed (approximately 1 Mbps). Further, the Bluetooth® wireless technology achieves downsizing of a communication module and excellent connectability between devices, especially between devices of different types.

Accordingly, the Bluetooth® wireless technology has been applied to various devices, mainly mobile terminals, such as cellular phones and PDAs, and is becoming increasingly common as one of the future mainstream wireless data communication systems. Because the Bluetooth® wireless technology achieves data communication at low power consumption and a downsized communication module, the communicable range in a one-to-one communication is as short as approximately 10 to 100 meters. Therefore, it often and easily happens that a Bluetooth® equipped terminal moves to a position out of the communicable range while carrying out the wireless communication with the other Bluetooth® equipped terminal.

There have been various methods for placing a wireless communication terminal back within a communicable range of a communication target when the wireless communication terminal moves to a position out of the communicable range of a communication target, in wireless communication technology other than the Bluetooth®. Those methods have been put into practical use. For example, there has been known a method such that, in wireless communication between a base station and a terminal, a distance between the terminal and the base station and a direction toward the base station from the terminal are displayed on a display of the terminal by detecting an electric field strength of radio waves from the base station.

However, it is difficult to implement the conventional guiding system using the electric field strength in the Bluetooth® wireless communication system. Under the present circumstances, manufacturers, who manufacture Bluetooth® wireless communication devices, purchase RF modules, baseband modules, firmware ROMs (which are recently integrated into a one-chip), and protocol stack software for controlling the modules, and create various applications by using the protocol stack API (application program interface) to control Bluetooth® modules.

The protocol stack is standardized in its detail. The protocol stack offers a means for controlling a power of radio waves of a device to control a lower module by an application or to obtain data from the lower module. However, the protocol stack does not include a means for controlling other controls and obtaining other data. Accordingly, information as to the electric field strength cannot be obtained by controlling the Bluetooth® module via an application layer. Accordingly, the conventional guiding method using the electric field strength cannot be applied to the Bluetooth® wireless system.

SUMMARY OF THE INVENTION

The invention thus provides a method for guiding a wireless communication device into a communicable range of a communication target when the wireless communication device moves to a position out of the communicable range, without using an electric field strength from the communication target.

According to one exemplary aspect of the invention, a method for guiding a wireless communication device, which is designed to implement wireless data communication with an external communication target, into a communicable range where the wireless communication device can perform wireless data communication with the communication target, includes the steps of setting a position of the wireless communication device within the communicable range as an origin point, calculating at least one of a distance and a direction between the origin point and a location of the wireless communication device after moving the wireless communication device, and providing guidance information in order to place the wireless communication device back to the origin point in accordance with at least one of the calculated distance or direction.

That is, once a direction or a distance, from an origin point to a position where the wireless communication device has moved and currently located within the communicable range is calculated, a distance or direction from the current position to the origin point, can be obtained from the calculated data. Therefore, even when the wireless communication device moves to a position out of the communicable range of the communication target, guidance information to be used to place the wireless communication device back to the origin point can be created and provided by the above-described method. It is thus possible to guide the wireless communication device into the communicable range without using the conventional method using an electric field strength from the communication target.

BRIEF DESCRIPTION OF THE DRAWINGS

Embodiments of the invention will be described in detail with reference to the following figures wherein.

DETAILED DESCRIPTION OF PREFERRED EMBODIMENTS

Figure 1:
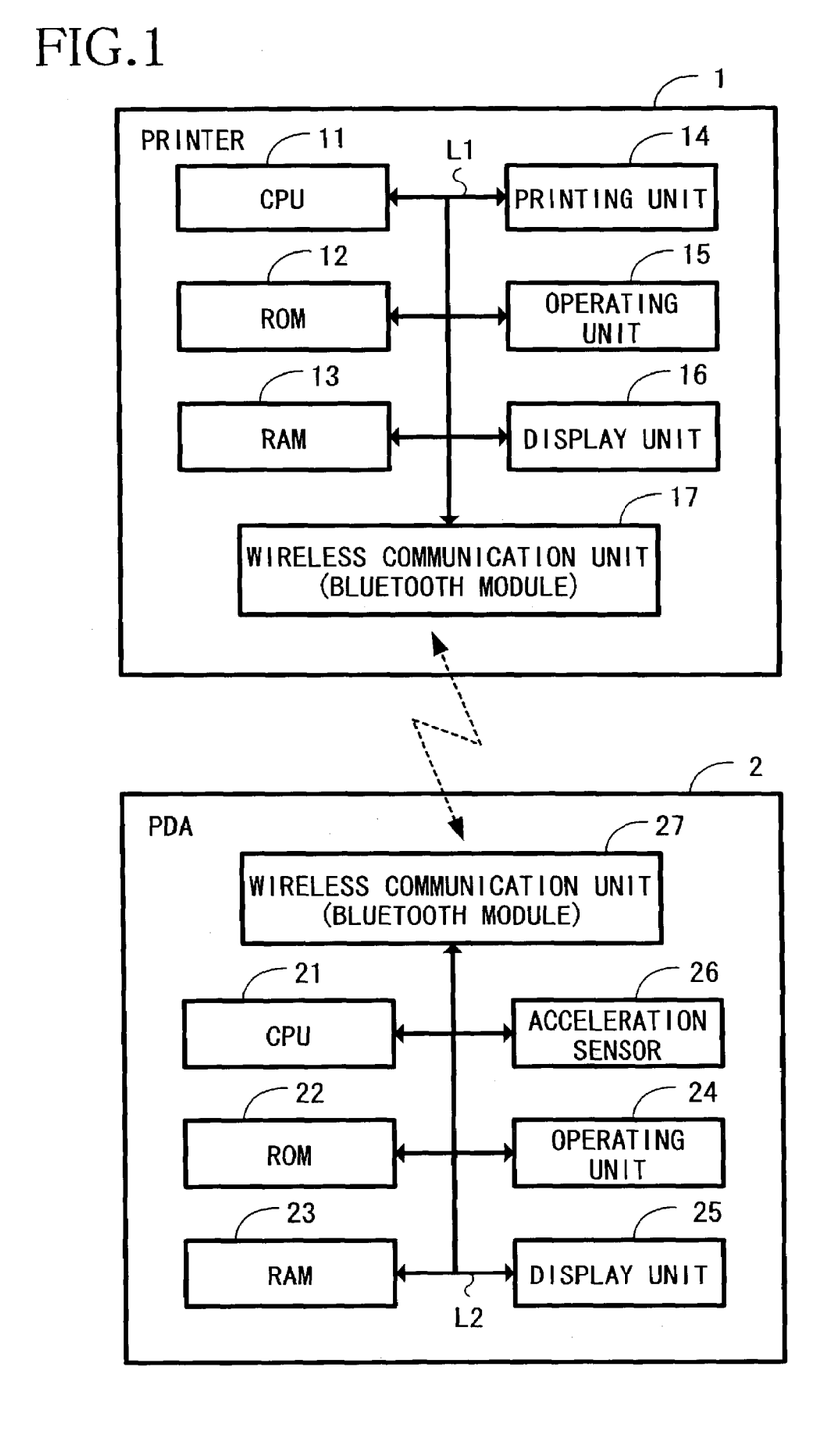
FIG. 1 is a schematic diagram showing structures of a printer and a PDA according to a first embodiment of the invention.

Embodiments of the invention will be described with reference to the accompanying drawings. A first embodiment of the invention will be described below. FIG. 1 is an explanatory diagram showing schematic structures of a printer 1 and a PDA (personal digital assistant) 2 of the first embodiment. In this embodiment, the printer 1 is stationarily installed, and the PDA 2 is designed so as to transmit/receive data to/from the printer 1.

The printer 1, as a communication target, includes a CPU 11, a ROM 12, a RAM 13, a printing unit 14, an operating unit 15, a display unit 16 and a wireless communication unit 17, which are connected with each other via a bus line L1.

The CPU 11 controls all of the operations to be performed by the printer 1 and data communication with an external wireless communication device (for example, the PDA 2 in the embodiment) via the wireless communication unit 17. The ROM 12 stores various programs for the controls to be performed by the printer 1. The CPU 11 performs various controls according to the programs.

The RAM 13 temporarily stores data to be created when the CPU 11 performs the controls. When the printer 1 receives a request to execute a print job from the PDA 2 (i.e., the PDA 2 transmits print data to the printer 1), the CPU 11 temporarily stores the received print data in the RAM 13, and then, the print data is printed by the printing unit 14. After that, the CPU 11 erases the print data from the RAM 13. The printing unit 14 performs printing (forms images) onto recording sheets in accordance with print data inputted from the external devices.

The operating unit 15 is used by a user to perform settings of the printer 1. The display unit 16 displays various information about the operations performed by the printer 1, such as an operating status and setting conditions of the printer 1.

Although the drawings are omitted, the printer 1 includes an input interface (such as an RS-232C or a USB port) to receive print data from external devices, in addition to the wireless communication unit 17. When the printer 1 is requested from the external device, such as a personal computer, to perform a print job, the printer 1 prints the print data, inputted via the input interface, by the printing unit 14.

The wireless communication unit 17 of the printer 1 of the embodiment transmits/receives various data to/from external Bluetooth® communication terminals, using the Bluetooth® wireless communication system. The wireless communication unit 17 includes a Bluetooth® module, which is a one-chip module including several modules required for the Bluetooth® wireless communication system, and is incorporated with various protocol stacks for controlling data transmission.

The PDA 2, as a wireless communication device, is a well-known portable terminal that mainly controls private information, such as schedules, memorandums, mails and address files. The PDA 2 includes a CPU 21, a ROM 22, a RAM 23, an operating unit 24, a display unit 25, and a wireless communication unit 27, which are connected with each other via a bus line L2. In this embodiment, an acceleration sensor 26 is provided to the PDA 2. The acceleration sensor 26 is also connected with the above-described units via the bus line L2.

The CPU 21 controls all operations to be performed by the PDA 2 and data communication with an external wireless communication device (for example, the printer 1 in the embodiment) via the wireless communication unit 27. The ROM 22 stores programs for various controls to be performed by the PDA 2. The CPU 21 performs the controls according to the programs stored in the ROM 22.

The RAM 23 temporarily stores data to be created when the CPU 21 performs the controls. The operating unit 24, having a plurality of keys and/or buttons (not shown), is used by the user to input various data into the PDA 2 and instruct various operations. The user can also input the data and instruct the operations by touching a display panel 25a (FIG. 3) of the display unit 25 (a liquid crystal display in this embodiment) of the PDA 2 with a pen (not shown).

The display panel 25a of the display unit 25 performs general functions of the PDA 2, such that the display panel 25 displays various data inputted by the user. In addition, the display panel 25a has a function of displaying guidance information for placing the PDA 2 back within a communicable range of the printer 1 when the PDA 2 moves to a position out of the communicable range, in which the Bluetooth® wireless communication can be achieved. The details of this function will be described later with reference to FIG. 3.

The acceleration sensor 26, as an acceleration detecting unit, can detect accelerations of two axes in a two-dimensional plane. After the acceleration sensor 26 detects an acceleration of each axis, the obtained accelerations are inputted into the CPU 21. Then, the CPU 21 calculates a moving velocity of the PDA 2 based on the inputted acceleration of each axis. Further, based on the accelerations and the moving velocity, a moved distance and a moved direction are obtained (described later). Based on the obtained moved distance and direction, the above-described guidance information is created.

In this embodiment, the acceleration sensor 26 is provided to the PDA 2 such that a two dimensional plane of the acceleration sensor 26 is parallel to a ground plane (a plane perpendicular to an axis of the earth) when the display panel 25a of the display unit 25 of the PDA 2 is parallel to the ground plane.

The wireless communication unit 27, as the Bluetooth® module, is similar in structure and function to the wireless communication unit 17 of the printer 1, except a profile of the Bluetooth®. The standardized technology and specifications in data communication between Bluetooth® equipped devices (between the printer 1 and the PDA 2 in this embodiment), such as an establishment of a communication link, access to a communication target, and changing of a status from a connection mode to another mode (e.g. a park mode or a sniff mode), are well-known as basic technology of the Bluetooth® wireless communication. Accordingly, explanations for those technology will be omitted.

It is assumed that various data created by the PDA 2 are printed by the printer 1 by performing data communication between the printer 1 and the PDA 2 in the Bluetooth® wireless communication system. In this case, the user of the PDA 2 transmits print data, within a communicable range in which data communication can be achieved between the PDA 2 and the printer 1. Then, the printer 1 prints the received print data by the printing unit 14. However, there may be a case where the user, who holds the PDA 2, unintentionally moves to a position out of the communicable range of the printer 1.

In case the above-described case happens, the PDA 2 of the embodiment calculates its moving velocity, moved distance and direction between a new position and a prior position, from which the PDA 2 moves at all times. Therefore, when the PDA 2 moves to a position out of the communicable range of the printer 1, the PDA 2 creates guidance information based on the calculated results, in order to guide the PDA 2 into the communicable range.

Figure 2:
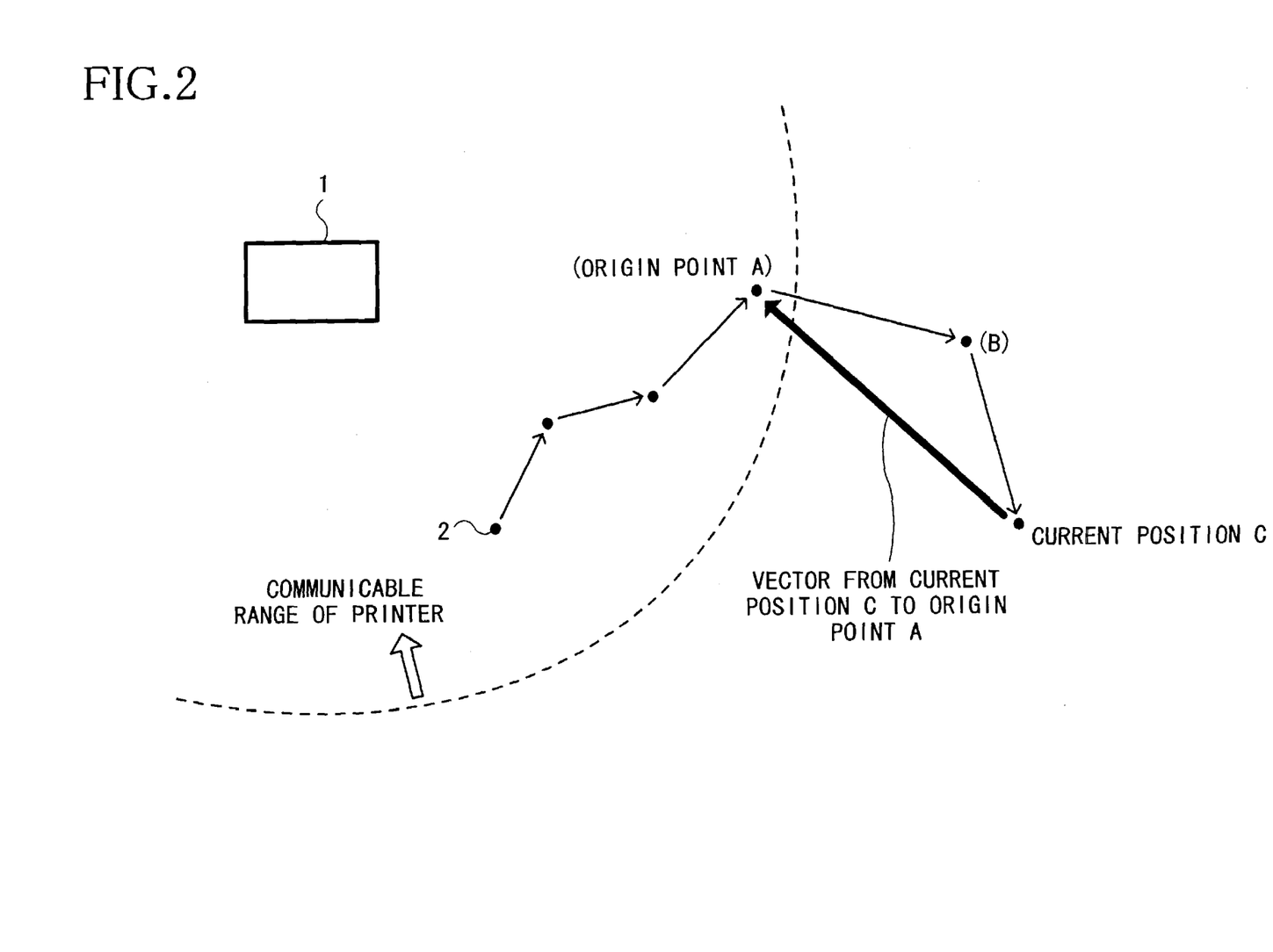
FIG. 2 is an explanatory diagram of a principle of guidance information creation.

A principle of guidance information creation will be described with reference to FIG. 2. As shown in FIG. 2, while the PDA 2 exists within the communicable range of the printer 1, a position of the PDA 2 is detected at regular time intervals and the position where the PDA 2 is located at a time of detecting its position is recorded as an origin point. The origin point is updated to a new position, where the PDA 2 is detected, while the PDA 2 moves within the communicable range of the printer 1. The moved directions and distances of the PDA 2 between positions are obtained based on accelerations of two axes detected by the acceleration sensor 26.

It is assumed that the PDA 2 is detected at a position B, which is located out of the communicable range of the printer 1, after the PDA has been detected at a position A, which is located within the communicable range of the printer 1 (that is, the PDA 2 moves from the position A to the position B) (FIG. 2). In this case, the origin point is not updated, that is, the position B is not recorded as a new origin point, because the position B is not located within the communicable range. The origin point A, has been recorded as the latest origin point immediately before the PDA 2 moved to the position out of the communicable range of the printer 1, is held as the latest origin point. A moving velocity, a moved distance and a moved direction of the PDA 2 between the position A and the position B have been calculated. Then, it is assumed that the PDA 2 is detected at a (current) position C the PDA has been after detected at the position B (that is, the PDA 2 moves to the position C from the position B). A moving velocity, a moved distance and a moved direction of the PDA 2 between the position B and the position C have been calculated. Then, guidance information is displayed on the display panel 25a of the display unit 25 of the PDA 2 based on a vector (including required moving direction and distance) from the current position C to the origin point A. Therefore, the user can easily place the PDA 2 back within the communicable range of the printer 1 according to the guidance information.

Figure 3A:
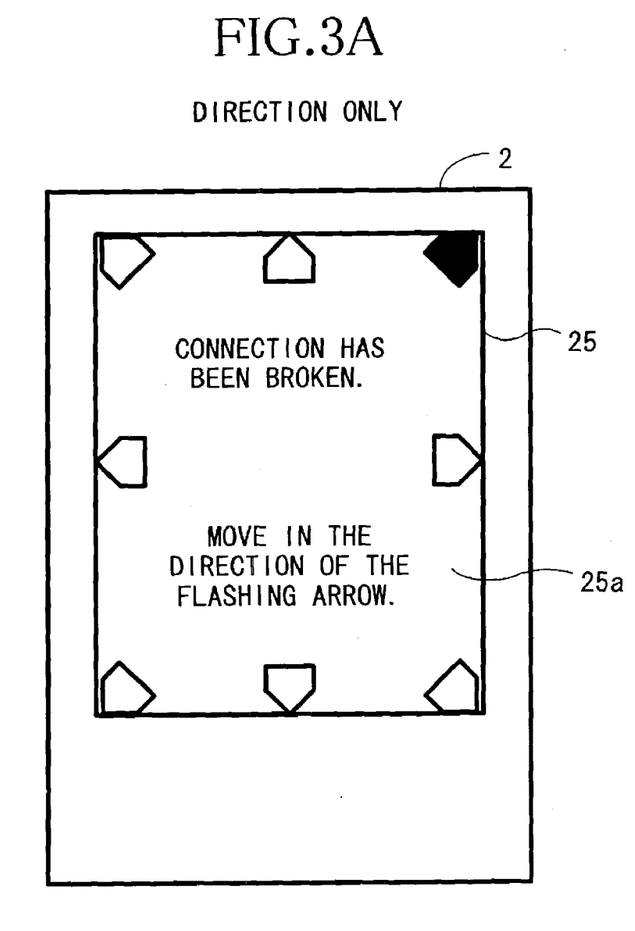
FIGS. 3A and 3B are explanatory diagrams of examples of guidance information to be displayed on a display unit of the PDA.
Figure 3B:
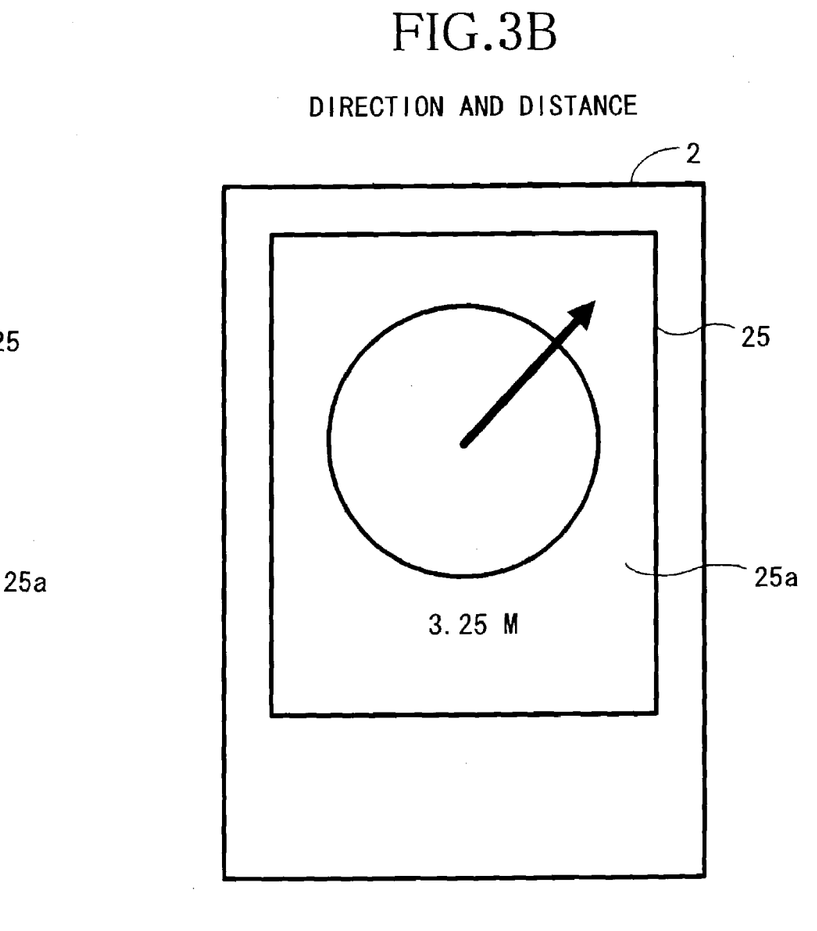

FIGS. 3A and 3B show examples of guidance information to be displayed on the display panel 25a of the display unit 25 of the PDA 2. In FIG. 3A, the display panel 25a displays a direction toward an origin point only (using a flashing arrow). In addition to this, the display panel 25a displays messages, for example, "Connection has been broken." and "Move in the direction of the flashing arrow." In FIG. 3B, the display panel 25a displays a direction toward an origin point and a distance from the current position of the PDA 2 to the origin point. As described above, guidance information is displayed on the display panel 25a in order to place the PDA 2 back within the communicable range of the printer 1. By doing so, the user moves with the PDA 2 according to the guidance information, so that the PDA 2 can be placed back within the communicable range of the printer 1.

The acceleration sensor 26, which can detect accelerations of two axes in a two dimensional plane as described above, is attached to the PDA 2 so that the two dimensional plane is parallel to a surface of the display panel 25a of the display unit 25. Therefore, in order to correctly display the direction toward the origin point and/or required moving distance to the origin point on the display panel 25a, the PDA 2 needs to be held such that the surface of the display panel 25a is kept parallel to the ground plane and the orientation of the PDA 2 on the ground plane is maintained after the power of the PDA 2 is turned on (that is, after the recording of an origin point and calculation of moved distances and moving velocities of the PDA 2 is started). Accordingly, a user's manual of the PDA 2 includes a note, for example, "Keep the orientation of the device as it is and the surface of the display panel in the horizontal position when you move".

Next, guidance information creating processing to be performed by the CPU 21 will be described with reference to FIG. 4. The guidance information of FIG. 3 is created based on the detection results of the acceleration sensor 26. The guidance information creating processing is executed by the CPU 21 upon turning the power of the PDA 2 on.

As the processing starts, first, at step 110 (hereinafter, S stands for step), an origin point S0 (Sx0, Sy0) is set to (−1, −1) and a current position S (Sx, Sy) is set to (0, 0). The origin point S0 (−1, −1) means that the PDA 2 has not been moved into the communicable range of the printer 1 yet after the power of the PDA 2 is turned on. The current position S (0, 0) means that an origin point has not been recorded yet or the PDA 2 exists within the communicable range of the printer 1. An x element and a y element of each position indicate each axis of the acceleration sensor 26.

At S120, the accelerations are defaulted. More specifically, both accelerations ax and ay of the two axes are set to 0. At S130, a velocity of the PDA 2 is calculated. However, both velocities Vx and Vy of the two axes are 0 at this point because the accelerations have been just set to 0. The velocities Vx, Vy of the PDA 2 are obtained by a following well-known formula (1).

$$\left.\begin{array}{l} Vx = Vx0 + ax \cdot T \\ Vy = Vx0 + ay \cdot T \end{array}\right\} \quad (1)$$

A time T in the formula (1) is a time between the instance when the processing of S130 is finished and the instance when flow goes back to S130 again after the processing of S140 and its subsequent processing are performed. The time T is fixed even when the subsequent steps of S140 are changed. In the formula (1), velocities Vx0 and Vy0 are equal to velocities Vx and Vy obtained the last time at S130.

Immediately after the power of the PDA 2 is turned on, the velocities Vx and Vy are set to 0.

At S140, accelerations ax and ay are detected (that is, detection results of the acceleration sensor 26 are obtained), and the flow moves to S150. At S150, it is determined whether the PDA 2 can communicate with the printer 1, that is, it is determined whether the PDA 2 exists within the communicable range of the printer 1. This determination is performed by which the PDA 2 broadcasts (inquires) a search command to devices around the PDA 2 and determines whether any devices have responded to the search command.

When it is determined that the PDA 2 is out of the communicable range of the printer 1 (S150:NO), flow moves to S170. At S170, it is determined whether the origin point Sx0 is −1, which is a value set at S110. When the origin point Sx0 is −1 (that is, the PDA 2 has not been moved into the communicable range yet) (S170:YES), flow goes back to S130 and subsequent steps are performed. When the origin point Sx0 is not −1 (that is, the origin point Sx0 has been set to 0 at S160 because the PDA 2 has been within the communicable range) (S170:NO), flow moves to S180. When an affirmative judgement is made at S150, flow moves to S160 to set the origin point S0 and the current position S to 0, respectively. Then, flow goes back to S130. That is, a position of the PDA 2, which is located at time of detecting its position, is recorded as an origin point.

That is, while the PDA 2 exists out of the communicable range of the printer 1 after the power of the PDA 2 is turned on, a negative judgement is made at S150 and then an affirmative judgement is made at S170. After that, flow goes back to S130. This cycle is repeated until the PDA 2 moves to a position within the communicable range of the printer 1 after the power of the PDA 2 is turned on. However, once the PDA 2 moves to a position within the communicable range, an affirmative judgement is made at S150 and then flow moves to S160 to set the origin point S0 and the current position S to 0, respectively. After that, flow moves to S130. This cycle is repeated while the PDA 2 exists within the communicable range of the printer 1. In other words, while the PDA 2 is within the communicable range, the origin point S0 and the current position S are set to 0 at any position, and the position where the PDA 2 is located at time of detecting its position, is recorded as a latest origin point. Also, while the PDA 2 moves within the communicable range, detecting the acceleration a (S140) and calculating the velocity V based on the acceleration a (S130) are repeatedly performed between positions in order to obtain the latest velocities and accelerations between a current position and a position where the PDA 2 is previously located, at all times.

In a case where the PDA 2 moves to a position out of the communicable range again, although the PDA 2 has been within the communicable range once, a negative judgement is made at S150 and S170 and flow moves to S180. At S180, a moved distance of the PDA 2 from the origin point is calculated with respect to each axis based on the velocity V (Vx, Vy) (values obtained at S130) and the acceleration a (ax, ay) (values obtained at S140) at this point. In other words, a current position S is calculated with respect to the set origin point. The moved distance of each axis is obtained by a following well-known formula (2).

$$Sx = \left(Vx \cdot T + \frac{1}{2} \cdot ax \cdot T^2\right) + Sx$$
$$Sy = \left(Vy \cdot T + \frac{1}{2} \cdot ay \cdot T^2\right) + Sy$$
(2)

After the current position S with respect to the origin point is obtained at S180, flow moves to S190 to display a direction toward the origin point (an origin point direction) on the display panel 25a based on the obtained current position S (Sx, Sy), as shown in FIGS. 3A and 3B. Guidance information, which corresponds to a vector (−Sx, −Sy) indicating a direction from the current position S to the origin point, is displayed on the display panel 25a.

After S190, flow goes back to S130. While the PDA 2 is out of the communicable range, the processing of S130 and its subsequent steps are repeatedly performed. Every time these steps are performed, the latest velocity V and acceleration a are obtained at all times (S130 and S140). At S150 and S170, a negative judgement is made, and the processing of S180 is performed. Although the current position S is updated every time the processing of S180 is performed, the origin point is not changed (the origin point, which is located within the communicable range and has been recorded immediately before the PDA 2 moves to a position out of the communicable range, is not changed). Accordingly, every time the processing of S180 is performed, guidance information is created at S190 based on the result of S180 and is displayed on the display panel 25a. Thus, the user, who holds the PDA 2, can go back within the communicable range of the printer 1 according to the guidance information.

Then, when the PDA 2 is placed back within the communicable range, an affirmative judgement is made at S150 and flow moves to S160 to update the origin point SO and the current position S. That is, the position of the PDA 2, which is located within the communicable range and detected after returning within the communicable range, is recorded as a latest origin point.

As described above, in this embodiment, the PDA 2 obtains its acceleration at all times by itself by using the acceleration sensor 26 provided thereto, and detects its current position based on the obtained acceleration. When the PDA 2 moves to a position out of the communicable range of the printer 1, the position of the PDA 2, which is located within the communicable range and has been recorded as an origin point immediately before the PDA 2 moved to a position out of the communicable range, is kept as a latent origin point and the PDA 2 provides the user with guidance information to go back to the origin point.

Accordingly, it becomes possible to guide the PDA 2 into the communicable range of the printer 1 without using the conventional method that uses the electric field strength from a communication target. Especially, when the Bluetooth® wireless technology is adopted to a wireless communication terminal like the PDA 2 of the embodiment, the wireless communication terminal cannot obtain information about the electric field strength from the terminal protocol stack. Thus, the above-described method of the embodiment is effective on the wireless communication terminal using the Bluetooth® wireless technology.

Figure 4:
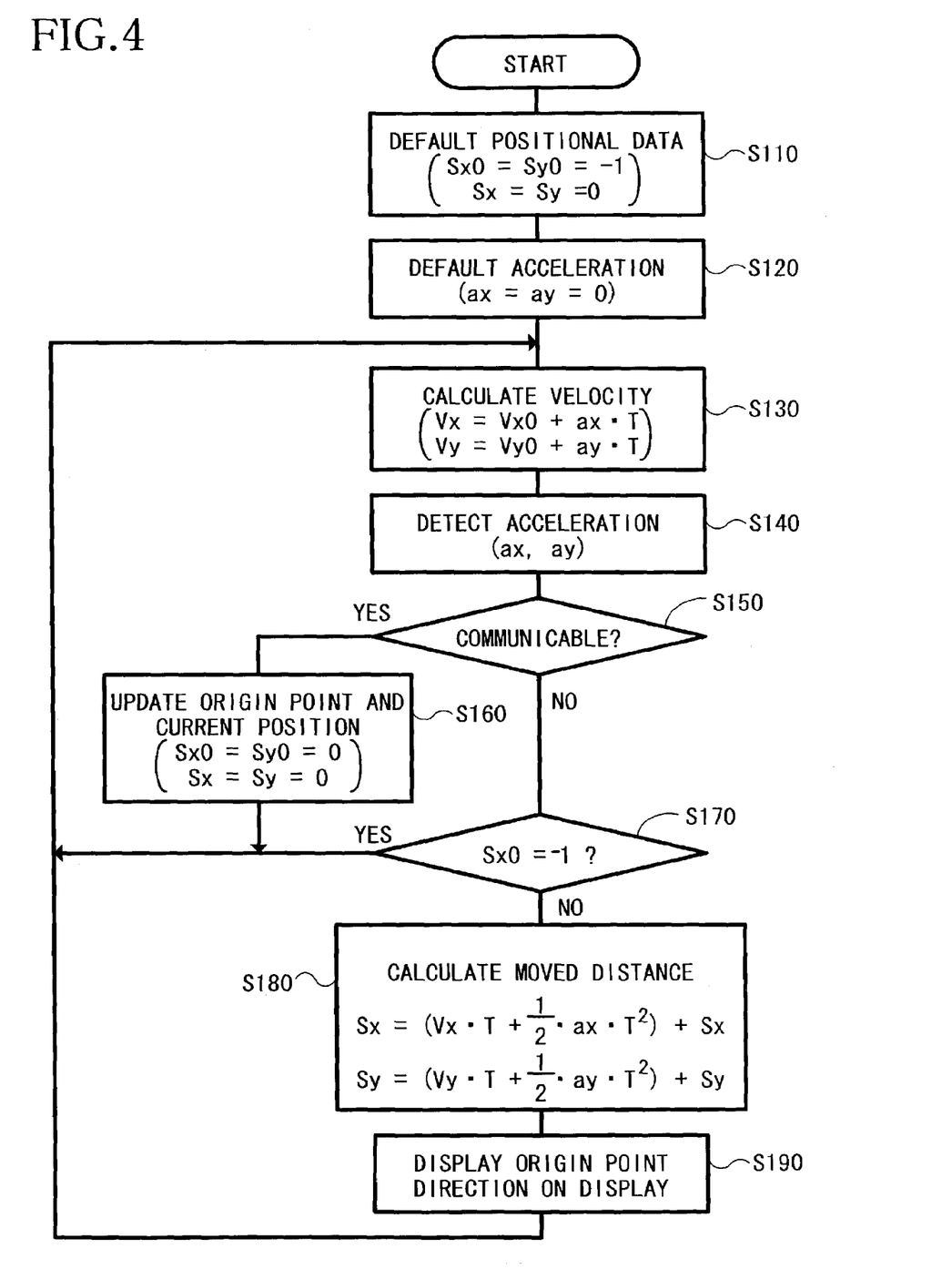
FIG. 4 is a flowchart of guidance information creating processing according to the first embodiment.

In the guidance information creating processing of FIG. 4, the processing of S150 corresponds to the processing performed by a communicability determination unit, the processing of S160 corresponds to the processing performed by a recording unit, the processing of S180 corresponds to the processing performed by a moving status detecting unit, and the processing of S190 corresponds to the processing performed by a guidance information providing unit.

In the embodiment, the position of the PDA 2, which is located within the communicable range and was detected immediately before the PDA 2 moves to a position out of the communicable range, is recorded as an origin point and guidance information is created and provided to the user to place the PDA 2 back to the origin point. However, it is not necessarily required that the above-described position, which is located near the border of the communicable range, is recorded as an origin point, but any position within the communicable range can be recorded as an origin point.

Figure 5A:
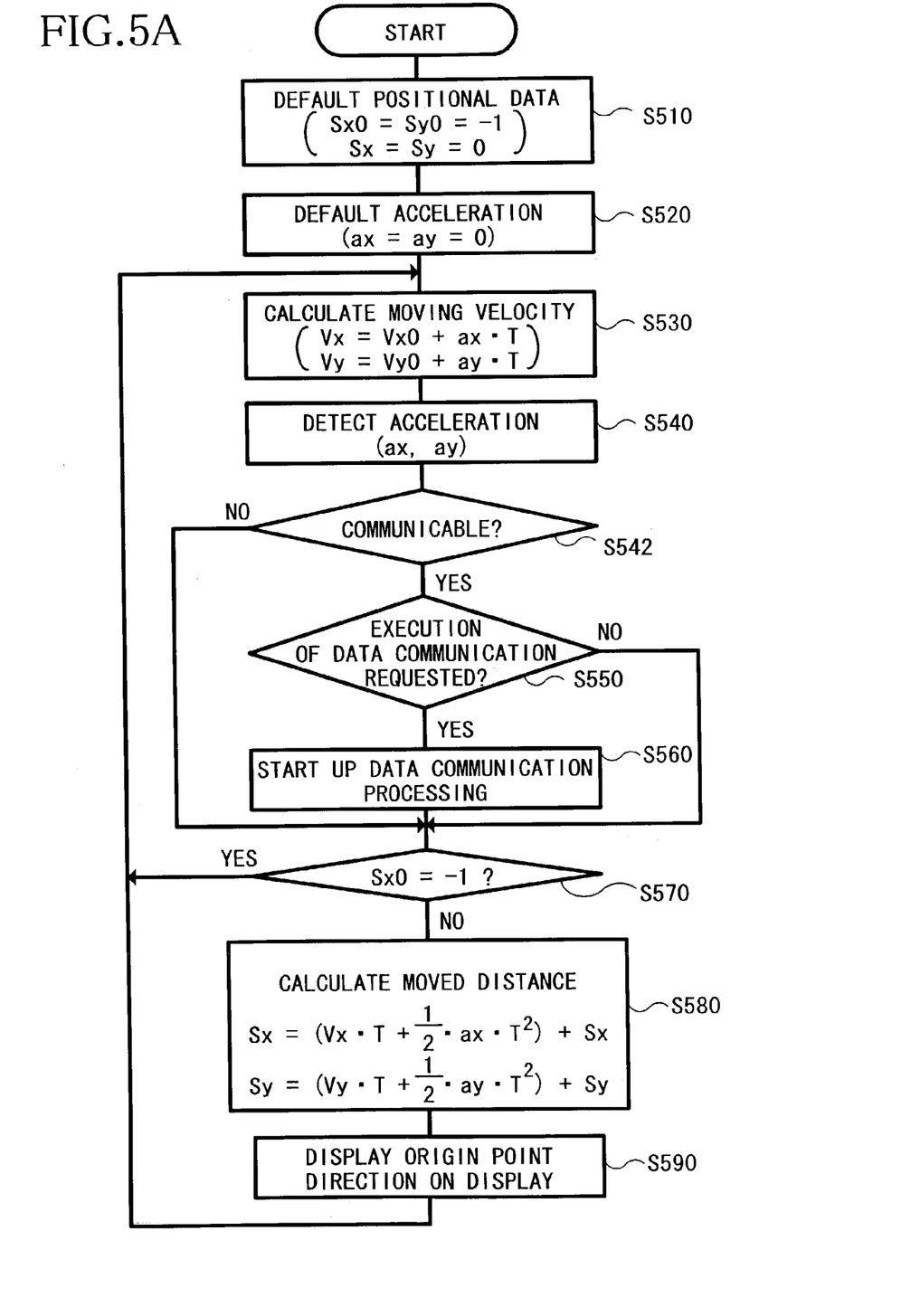
FIG. 5A is a flowchart of a variation of the guidance information creating processing to be executed by the PDA of the first embodiment.

For example, a position, which is located within the communicable range and where data communication between the PDA 2 and the printer 1 has been actually performed and normally completed, is recorded as an origin point. Then, guidance information is created and provided to guide the PDA 2 to the origin point when the PDA 2 moves to a position out of the communicable range. FIG. 5A shows a flowchart of guidance information creating processing in the above-described case. In the guidance information creating processing of FIG. 5A, the processing of S510 to S540 and the processing of S570 to S590 are the same as the processing of S110 to S140 of FIG. 4 and the processing of S170 to S190 of FIG. 4, respectively. Therefore, explanations for those processing will be omitted.

In this processing, after the calculation of the velocity V (S530) and the detection of the acceleration a (S540) are performed, it is determined whether the PDA 2 can communicate with the printer 1 at S542. When the PDA 2 cannot communicate with the printer 1 (S542:NO), flow moves to S570. When the PDA 2 can communicate with the printer 1, flow moves to S550. At S550, it is determined whether an execution of data communication has been requested. For example, when the user operates the operating unit 24 of the PDA 2 to transmit print data and instruct the printer 1 to print the print data, a data communication request flag is set in the PDA 2. The determination of S550 is performed with reference to the presence or absence of the data communication request flag. When the flag is not set (S550:NO), it is determined that the execution of data communication has not been requested and flow moves to S570. When the flag is set (S550:YES), flow moves to S560 and data communication processing is started.

Figure 5B:
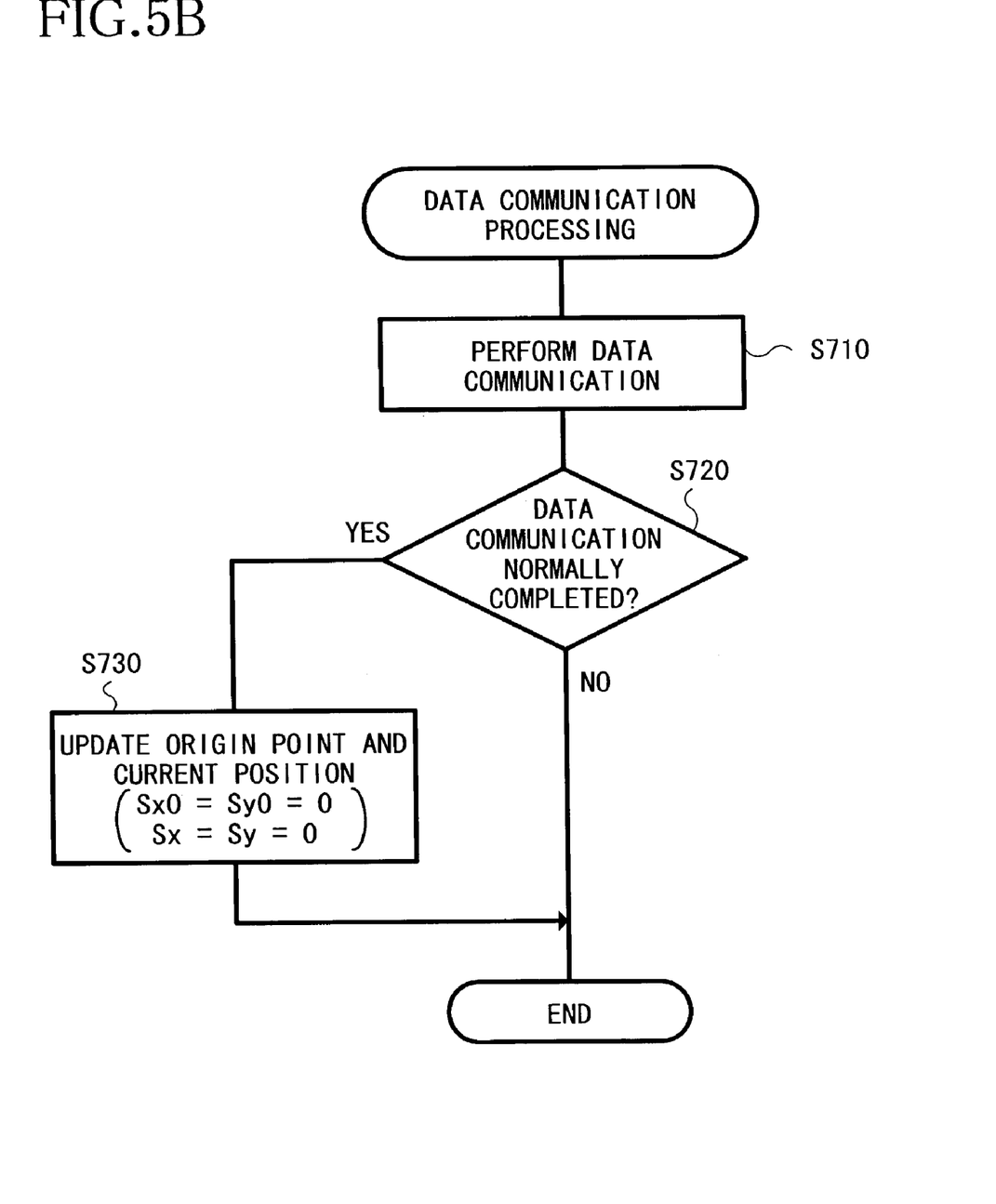
FIG. 5B is a flowchart of data communication processing to be executed by the PDA, with the execution of the variation of the guidance information creating processing, according to the first embodiment.

The data communication processing is a task that is to be performed separately from the guidance information creating processing, but is concurrently performed with the guidance information creating processing. FIG. 5B shows a flowchart of the data communication processing. When this processing starts, data communication is performed at S710. That is, desired data (e.g. print data) is transmitted from the PDA 2 to the printer 1. After the data communication at S710 is completed, flow moves to S720 to determine whether the data communication has been normally completed. When the data communication has not been normally completed (S720:NO), this processing is finished. When the data communication has been normally completed (S720:YES), flow moves to S730 to update the origin point S0 and the current position S. The processing of S730 is the same as the processing of S1160 of FIG. 4. The position of the PDA 2, which is located at the time of detecting, is recorded as a new origin point.

Every time the origin point is updated, the processing of S580 is performed to obtain the current position S with respect to the origin point S0. Then, at S590, guidance information, which indicates the position where the data communication has been actually normally completed, is created and provided to the user. The processing of S730 of FIG. 5B corresponds to the processing performed by a recording unit of the invention.

As described above, if the PDA 2 is guided to the origin point where the data communication has been actually normally completed, a further high quality communication can be maintained as compared with the method in which a position is recorded as an origin point only on condition that the position is located within the communicable range as shown in FIG. 4.

Figure 6:
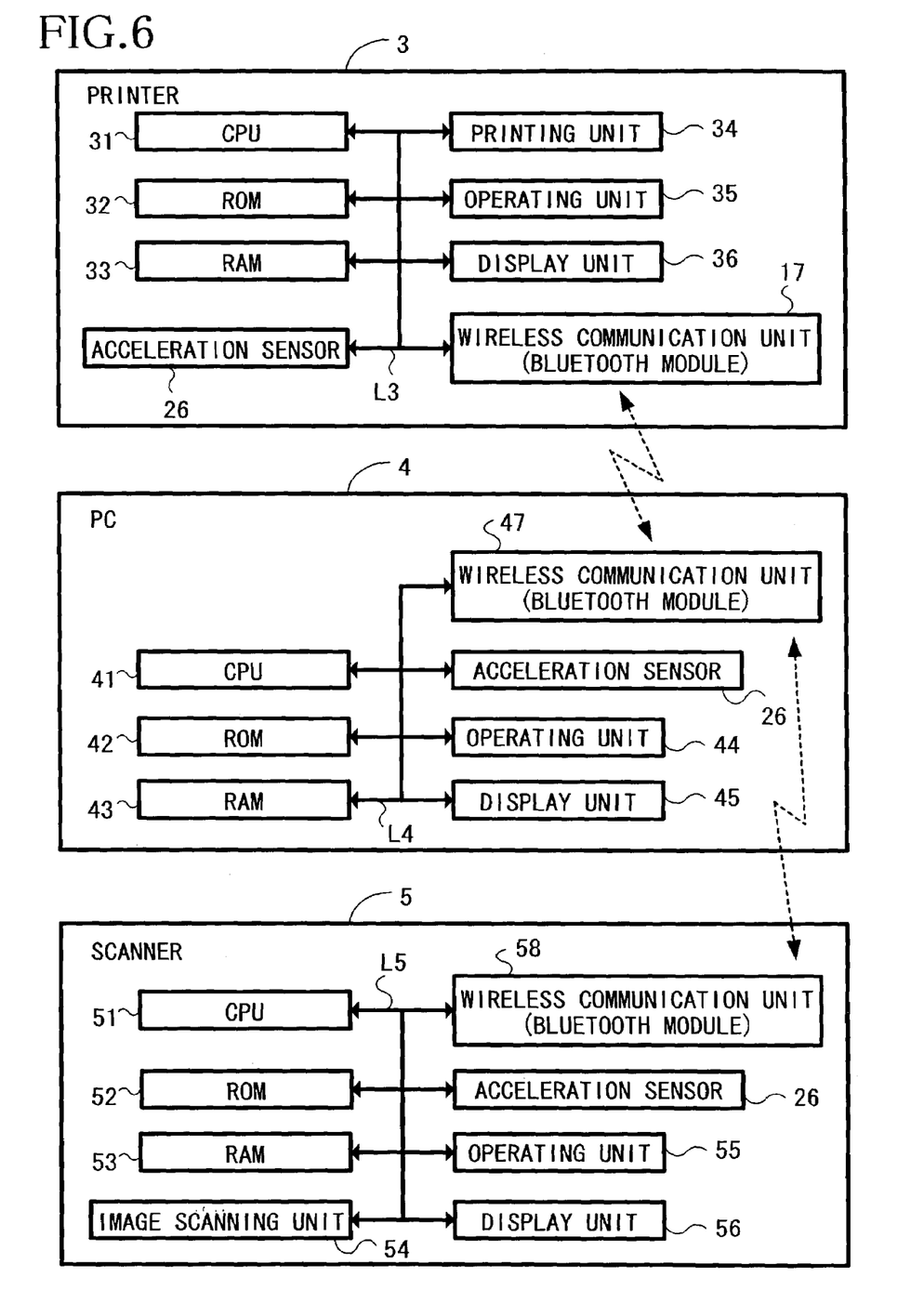
FIG. 6 is a schematic diagram showing structures of a printer, a personal computer and a scanner, according to a second embodiment of the invention.

Next, a second embodiment of the invention will be described below. In the first embodiment, the description has been made, taking the one to one communication (the printer 1 and the PDA 2) as an example. In the second embodiment, as shown in FIG. 6, it is designed such that data communication can be performed between a printer 3, a personal computer (PC) 4 and a scanner 5. In the second embodiment, also, the printer 3, the personal computer 4, and the scanner 5 perform data communication therebetween in the Bluetooth® wireless communication system.

The printer 3 is similar in structure to the printer 1 of the first embodiment. The printer 3 includes a CPU 31, a ROM 32, a RAM 33, a printing unit 34, an operating unit 35, a display unit 36 and a wireless communication unit 17, which are connected with each other via a bus line L3. The printer 3 also includes an acceleration sensor 26 to create guidance information by the CPU 31 based on a detection result of the acceleration sensor 26. The acceleration sensor 26 is also connected to the bus line L3.

The acceleration sensor 26 is a two-axis acceleration sensor that is the same as the acceleration sensor 26 provided to the PDA 2 of the first embodiment. The wireless communication unit 17 of the second embodiment is also the same as the communication unit 17 of the first embodiment. Accordingly, explanations for the acceleration sensor 26 and the wireless communication unit 17 will be omitted. The acceleration sensors 26 provided in the personal computer 4 and the scanner 5 are also the same as the acceleration sensor 26 of the first embodiment.

The personal computer 4 has a common structure, and includes a CPU 41, a ROM 42, a RAM 43, an operating unit 44, such as a keyboard, and a display unit 45 including a liquid crystal display, which are connected with each other via a bus line L4. In addition, the personal computer 4 includes a wireless communication unit 47, which includes a Bluetooth® module, and an acceleration sensor 26. The personal computer 4 has a function of creating guidance information by the CPU 41 based on a detection result of the acceleration sensor 26 (similar to the PDA 2 of the first embodiment). The CPU 41 performs various processing to control data communication with external wireless communication devices (e.g., the printer 3 and the scanner 5 in this embodiment) via the wireless communication unit 47.

The scanner 5 includes a CPU 51, a ROM 52, a RAM 53, an image scanning unit 54, an operating unit 55, a display unit 56, an acceleration sensor 26, and a wireless communication unit 58, which are connected with each other via a bus line L5. The CPU 51 controls all of operations to be performed by the scanner 5 and data communication with external wireless devices (e.g., the printer 3 and the personal computer 4 in the embodiment) via the wireless communication unit 58. The ROM 52 stores various control programs to be executed by the CPU 51. The RAM 53 temporarily stores data to be created when the CPU 51 executes processing. The image scanning unit 54 scans a surface of an original document as image data. The operating unit 55 is used by the user to perform settings of the scanner 5 and instruct operations. The display unit 56 displays the settings and operation status of the scanner 5. The acceleration sensor 26 detects acceleration of the scanner 5. The wireless communication unit 58 includes a Bluetooth® module.

The printer 3, the personal computer 4 and the scanner 5 can perform the guidance information creating processing of FIG. 4 or FIGS. 5A and 5B of the first embodiment. Accordingly, for example, while the personal computer 4 is stationarily installed, the printer 3 can be placed at a position as far as possible from the personal computer 4 (a position near the border of the communicable range within the communicable range of the personal computer 4) and the scanner 5 can be located in a position, which is opposite to the printer 3, and as far as possible from the personal computer 4 (a position near the border of the communicable range within the communicable range of the personal computer 4).

As described above, the printer 3 and the scanner 5 can be placed at the positions as far as possible from each other. Thus, a Piconet, which is a long-range wireless communication network, is established between the printer 3, the personal computer 4 and the scanner 5. Although normally the printer 3 and the scanner 5 cannot directly perform data communication with each other because of the long distance, the printer 3 and the scanner 5 can perform data communication via the personal computer 4 (as a junction point) in the Piconet. For example, image data scanned by the scanner 5 can be printed by the printer 3 by which the image data is transmitted from the scanner 5 to the printer 3 via the personal computer 4. In this case, a Scatternet is established by two interconnected Piconets, one of which is formed by the scanner 5 and the personal computer 4 and the other of which is formed by the personal computer 4 and the printer 3. The personal computer 4 interconnects the Piconets. In the one Piconet, the scanner 5 acts as a master and the personal computer 4 acts as a slave. In the other Piconet, the personal computer 4 acts as a master and the printer 3 acts as a slave.

For example, another Bluetooth® communication terminal can be newly provided within the communicable range of the printer 3 or within the communicable range of the scanner 5. Still another Bluetooth® communication terminal can be newly provided within the communicable range of the newly installed Bluetooth® communication terminal. In those cases, if installation positions of those terminals are determined by using the guidance information creating processing of FIG. 4 or FIGS. 5A and 5B of the first embodiment, a broader range Bluetooth® communication network (e.g. scatternet) can be established.

There may be a case where it is desired that a Bluetooth® communication terminal be installed in a position where the Bluetooth® communication terminal can directly communicate with all of the printer 3, the personal computer 4 and the scanner 5. In particular, when another Bluetooth® communication terminal is newly installed by using the Bluetooth® communication terminal as a junction point, it is preferable that, around the Bluetooth® communication terminal, there be more devices, with which the Bluetooth® communication terminal that functions as the junction point can directly perform data communication, in terms of the stability of the communication system.

Here, another guidance information creating processing will be described with reference to FIG. 7. This guidance information creating processing is effective in newly installing a Bluetooth® communication terminal in a position where the newly installed Bluetooth® communication terminal can perform data communication with as many Bluetooth® communication terminals as possible. Processing of S310, S320, S340, S350, S380 and S400 to S420 of FIG. 7 are the same as the processing of S110 to S140 and S160 to S190 of FIG. 4, so that explanations for those processing will be omitted and only different processing will be described below.

Figure 7:
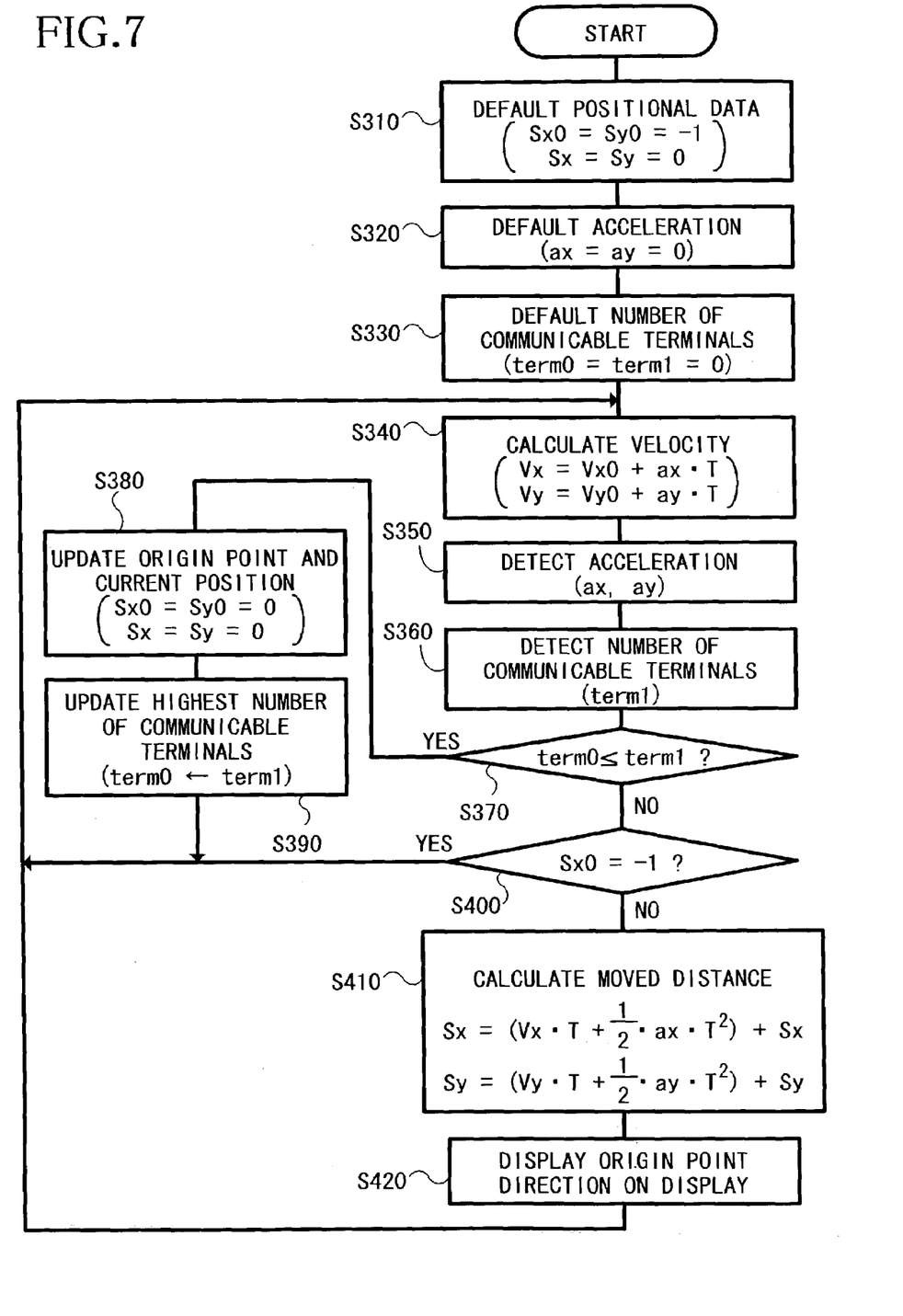
FIG. 7 is a flowchart of guidance information creating processing according to the second embodiment.

In the guidance information crating processing of FIG. 7, after the processing of S310 and S320, the number of communicable terminals term0 and term1 are defaulted at S330. Term0 indicates the highest number of communicable terminals that has been detected in the past Term1 indicates the number of communicable terminals that is detected at time of new searching (described later). Then, after the calculation of velocity V (S340) and the detection of acceleration a (S350) of the Bluetooth® communication terminal to be newly installed are performed, at S360, the number of currently communicable Bluetooth® communication terminals term1 is detected. This detection is achieved by detecting the number of terminals that responded to the broadcast, which is similar to S150 of FIG. 4.

At S370, it is determined whether the number of currently communicable terminals term1 detected at S360 is greater than or equal to the highest number of communicable terminals term0, which has been recorded in the past. When an affirmative judgement is made at S370, flow moves to S380 to record the position of the Bluetooth® communication terminal, which is located at time of detecting its position, as an origin point. Then, at S390, the highest number of communicable terminals term0 is updated to the number of communicable terminals term1. After that, flow goes back to S340.

That is, at the guidance information creating processing of FIG. 7, the position, at which the highest number of communicable terminals is detected, is always recorded as an origin point. Based on the origin point, guidance information to be used to place the terminal back to the origin point is created and provided to the user. Therefore, in FIG. 8, if a Bluetooth® communication terminal to be newly installed can perform the guidance information creating processing of FIG. 7, the Bluetooth® communication terminal can be surely guided to and installed in a position where the Bluetooth® communication terminal can directly communicate with all of the printer 3, the personal computer 4 and the scanner 5.

Figure 8:
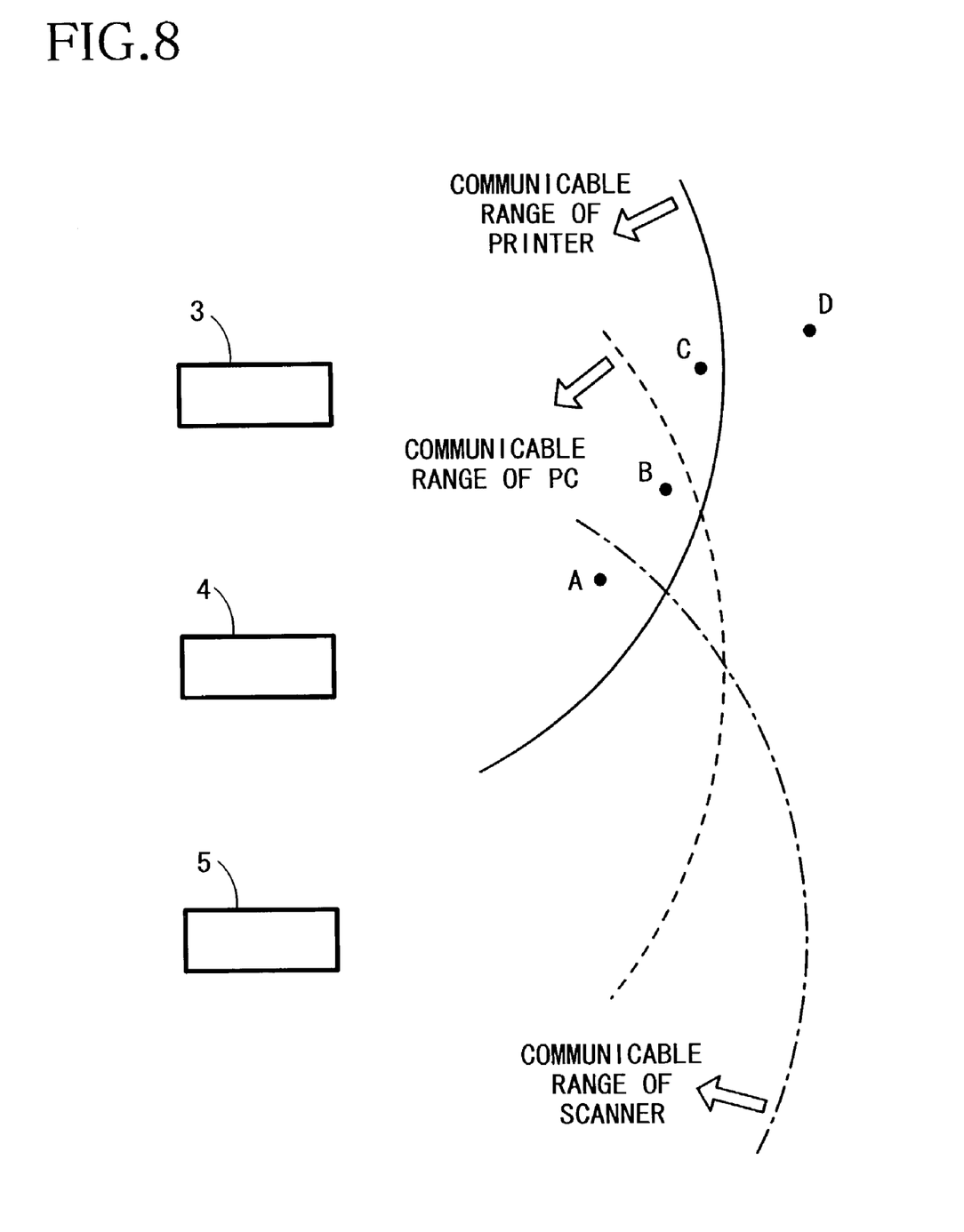
FIG. 8 is an explanatory diagram showing respective communicable ranges of the printer, the personal computer and the scanner according to the second embodiment.

More particularly, for example, when the power of the Bluetooth® communication terminal is turned on and the guidance information creating processing of FIG. 7 starts at a position B of FIG. 8, the position B is recorded as a position where at least two devices (the printer 3 and the personal computer 4) can communicate with the Bluetooth® communication terminal. Therefore, if the Bluetooth® communication terminal is moved to a position C or D from the position B, it is possible to place the Bluetooth® communication terminal back to the position B. Further, when the Bluetooth® communication terminal is moved to a position A, the Bluetooth® communication terminal can communicate with three devices at the position A. Thus, the position A is recorded as a new origin point. Accordingly, if the Bluetooth® communication terminal is moved to other positions, such as the position B, C, or D, the Bluetooth® communication terminal can be placed back to the position A where the Bluetooth® communication terminal can directly communicate with the three devices.

In the guidance information creating processing of FIG. 7, the processing of S360 corresponds to the processing performed by a communicable target detecting unit.

In the above-described embodiments, the explanations have been given by taking the communication between the printer 1 and the PDA 2 and the communication between the printer 3, the personal computer 4 and the scanner 5 as examples. However, it is needless to say that the invention can be adopted to various Bluetooth® equipped devices. For example, the invention can be adopted to the interconnection between a cellular phone and a personal computer, a PDA or a headset, each of which has the Bluetooth® communication technology. Various applications of the invention are conceivable.

In the above-described embodiments, the two-axis acceleration sensor 26 is used. However, a three-axis acceleration sensor can be used instead of the two-axis acceleration sensor 26. If the three-axis acceleration sensor is used, guidance information can be created based on acceleration in three dimensional plane, so that further precision guidance information can be provided.

In the first embodiment, in order to correctly display the origin point direction and the distance between a current position and an origin point on the display panel 25*a*, the user's manual of the PDA 2 includes a note, for example, "Keep the orientation of the device as it is and the surface of the display panel in the horizontal position when you move." However, the above restriction on the user may exacerbate the usability of the PDA 2.

In order to resolve this problem, a bearing sensor may be additionally provided to the PDA 2 to detect a direction of each axis of the acceleration sensor 26. With this structure, at least the orientation of the PDA 2 in the two dimensional plane can be detected at all times even when the orientation is changed. Further, for example, the acceleration sensor 26 is attached to the PDA 2 so that the two dimensional plane of the acceleration sensor 26 is to be held in parallel with the ground plane in the two dimensional plane at all times. With this structure, the origin point is to be correctly displayed on the display panel 25*a* at all times even though the orientation of the PDA 2 is changed or the PDA 2 is inclined in three dimensions. In this case, it is preferable that each axis of the acceleration sensor 26 be designed so as to point to a fixed direction at all times, like a magnetic bearing.

Instead of the above-described method, a gyrosensor can be used to detect the orientation change and/or rotation of the PDA 2 and guidance information can be created and provided based on the detection result. If both of the three-axis acceleration sensor and the three-axis gyrosensor are provided to the user to the PDA 2, guidance information can be created and provided with consideration given to any movement and rotation of the PDA 2 in three dimensions. Thus, the precision of the guidance information can be improved.

The above-described contrivance (the additional provision of the bearing sensor or the gyrosensor, keeping the two dimensional plane of the acceleration sensor 26 parallel with the ground plane, or keeping the two axes of the acceleration sensor 26 so as to point the fixed direction) are not only adopted to the printer 1 and the PDA 2 of the first embodiment but also adopted to the printer 3, the personal computer 4 and the scanner 5 of the second embodiment.

In the above-described embodiments, moved directions and distances of the Bluetooth® equipped device is obtained based on acceleration detected by the acceleration sensor 26. However, it is needless to say that the detector is not limited to the acceleration sensor 26. For example, an origin point and a current position may be obtained by using a well-know GPS (Global Positioning System), which has been used, for example, in car navigation systems and cellar phones. A direction and a distance from the current position to the origin point may be calculated in accordance with the data obtained by the GPS.

The currently-used GPS is a DGPS (Differential GPS) with high accuracy. For example, even when the orientation and/or posture of a device is changed while a user moves with the device, the current position can be precisely obtained by using the GPS. Accordingly, there is no possibility that guidance information does not appear or wrong information appears due to the losing of the directions and distances from the original point to the current position because the orientation and/or posture of the device is changed.

However, the GPS needs to receive radio waves from a satellite. Therefore, the GPS cannot work indoors where radio waves from the satellite are difficult to reach. On the other hand, the acceleration sensor 26 does not need to receive data from an external unit when detecting acceleration. Thus, the detecting method using the acceleration sensor 26 has an advantage that the acceleration sensor 26 can be used indoors where radio waves from the satellite are difficult to reach. Further, a detection accuracy (tolerance) of the DGPS is approximately 10 meters. Therefore, the detection tolerance of approximately 10 meters may become a problem in data communication between a wireless communication devices using the Bluetooth® communication technology because the communicable range of one-to-one communication between the Bluetooth® wireless communication devices is approximately between 10 and 100 meters.

Consequently, a suitable method can be selected from the various methods (using the acceleration sensor or GPS, or other conceivable methods) and adopted to the device, in accordance with conditions, such as situations and places where the device is used.

In the above-described embodiments, the explanations have been given with the printer, scanner, personal computer and PDA, which are equipped with the Bluetooth® communication technology, as examples of the wireless communication devices of the invention. However, the invention can be adopted to not only Bluetooth® equipped devices but also communication devices to be used in a wireless LAN (IEEE802.11a or IEEE802.11b). The invention can be adopted to any wireless communication devices as long as they can at least determine whether they are within a communicable range of a communication target by themselves.

The method of the invention can be adopted to wireless communication devices, which use a conventional method for guiding themselves within a communicable range of a communication target based on an electric field strength, replacing the conventional method. The method of the invention is further effectively used if adopted to wireless communication devices that cannot obtain data of the electric field strength within a range of a general usage like the Bluetooth® wireless communication devices of the above-described embodiments.

According to the above-described embodiments, a moved distance and a moved direction from an origin point to a current position are calculated by using acceleration of the wireless communication device itself. There is a well-known rule that if an acceleration of an object is obtained, a velocity can be obtained as an integration result and if a velocity is obtained, a distance can be obtained as an integration result. By using this rule (that is, based on the obtained acceleration), the moved distance and direction of the wireless communication device can be obtained.

According to the wireless communication device of the embodiments, the communicability determination unit determines whether the wireless communication device exists within the communicable range of the communication target. When it is determined that the wireless communication device is within the communicable range, the recording unit records an arbitrary position of the wireless communication device within the communicable range as an origin point. The moving status detecting unit detects a moved distance and a moved direction from the origin point to the current position. When the wireless communication device moves to a position out of the communicable range, guidance information to be used to place the wireless communication device back to the origin point is created and provided based on the detected distance and direction.

That is, the wireless communication device can guide itself within the communicable range when the wireless communication device moves to a position out of the communicable range. Therefore, even if the user, who holds the wireless communication device, moves to a position out of the communicable range, the user can go back within the communicable range based on guidance information for placing the wireless communication device back within the communicable range.

The recording unit can record any position within the communicable range as an origin point. However, it is more preferable that a position, which is detected immediately before the wireless communication device moves to a position out of the communicable range, be recorded as an origin point when it is determined that the wireless communication device does not exist within the communicable range.

As described above, by guiding the wireless communication device to the origin point, which is a position that is detected immediately before the wireless communication device moves to the position out of the communicable range, a maximum distance can be secured between the wireless communication device and the communication target. Accordingly, a broadband wireless communication network can be established as broad as possible. For example, if the determination is adopted to the Bluetooth® communication devices, a broader scatternet can be established with a small number of terminals.

When the communicability determination unit determines that the wireless communication device is out of the communicable range, the guidance information creating unit generates guidance information to provide the information to an external. That is, when it is determined that the guidance information is required, the guidance information is provided to the external.

Further, when data communication between the wireless communication device and the communication target is actually performed and the data communication is normally completed, the position of the wireless communication device where the data communication has been normally completed can be recorded as an origin point. In other words, it is designed such that a position can be recorded as an origin point only after the position is determined that the wireless communication device is within the communicable range and the data communication with the communication target has been normally completed, instead of deterring with reference to the position of the wireless communication device. By doing so, there is no possibility that a position where the wireless communication device cannot excellently perform data communication with the target due to external noises is recorded as an origin point. Accordingly, the wireless communication device can be placed back to the position, which is within the communicable range and the data communication can be normally performed. Thus, the communication quality can be further surely maintained.

Further, a position where the highest number of communicable communication targets is detected can be recorded as an origin point. That is, the wireless communication device includes the communicable target detecting unit that detects the number of communicable targets which can communicate with the wireless communication device. The recording unit records an arbitrary position of the wireless communication device where at least one communicable target is detected by the communicable target detecting unit, as an origin point. In addition, every time the communicable target detecting unit detects the highest number of communicable targets, the recording unit updates the origin point to the position where the highest number of communicable targets are detected.

As described above, the origin point is updated to a new position every time the position where the highest number of communicable targets is detected. Thus, the wireless communication device can be guided to the position where the communication device can perform data communication with more communication targets.

The moving status detecting unit includes the acceleration detecting unit that detects accelerations of two or more axes of the wireless communication device. Based on the accelerations detected by the acceleration detecting unit, at least one of a moved distance and moved direction of the wireless communication device is detected. When the acceleration detecting unit can detect accelerations of two axes, accelerations on a plane including the two axes can be obtained. Therefore, when the wireless communication device moves on the two dimensional plane, it is enough to detect the accelerations of two axes. When the wireless communication device is to be moved in three dimensions, an acceleration detecting unit that can detect accelerations of three axes should be used.

It is not a problem if the wireless communication device having the two-axis acceleration detecting unit is used while the two axes of the wireless communication device are always maintained in the horizontal position and the orientation of the wireless communication device is fixed. However, there may be cases where a moved distance and/or direction from the origin point cannot be correctly detected due to inappropriate movement of the wireless communication device.

Therefore, it is preferable that, in addition to the acceleration detecting unit, the wireless communication device, whose orientation may change while the user moves, such as mobile terminals as PDAs, be provided with a detecting unit that detects the orientation (in the two dimensional plane) and inclination (inclination of the two axes with respect to a fixed reference plane such as a plane perpendicular to the axis of earth) of the wireless communication device. With consideration given to all of the detection results of the acceleration detecting unit and the additional detecting unit, a direction and distance to the origin point is obtained.

In the wireless communication device, the moving status detecting unit detects a moved distance and direction and generates and provides at least one of the distance and direction from the current position and the origin point as guidance information. It is preferable that the guidance information include both of the distance and direction. The guidance information can be displayed on the display (LCD) of the wireless communication device or can be outputted by voice. Various informing methods can be adopted as long as the guidance information for guiding the wireless communication device into the communicable range can be provided to the user.

While the invention has been described in detail and with reference to the specific embodiments thereof, it would be apparent to those skilled in the art that various changes, arrangements and modifications may be applied therein without departing from the spirit and scope of the invention.

What is claimed is:

1. A method for guiding a wireless communication device, which is designed to implement wireless data communication with an external communication target, into a communicable range where the wireless communication device can perform wireless data communication with the communication target, comprising the steps of:
    setting a position of the wireless communication device within the communicable range as an origin point;
    calculating at least one of a distance and a direction between the origin point and a location of the wireless communication device after moving the wireless communication device; and
    providing guidance information in order to place the wireless communication device back to the origin point in accordance with at least one of the calculated distance or direction, wherein the wireless communication device sends data to the external communication target.

2. The method according to claim 1, wherein calculating the moved distance or direction is performed based on an acceleration of the wireless communication device.

3. A wireless communication device that performs wireless data communication with an external communication target, comprising:
    a controller that:
        determines whether the wireless communication device exists within a communicable range where the wireless communication device can perform data communication with the communication target;
        records a position of the wireless communication device as an origin point when the wireless communication device is determined to exist within the communicable range;
        determines at least one of a distance and a direction between the origin point and a location of the wireless communication device after moving the wireless communication device; and
        provides guidance information to be used to place the wireless communication device back to the origin point in accordance with at least one of the determined distance or direction, wherein the wireless communication device sends data to the external communication target.

4. The wireless communication device according to claim 3, wherein the controller records a position, which is detected within the communicable range immediately before the wireless communication device moves to a first position, which is out of the communicable range, as the origin point, when the wireless communication device is determined to be out of the communicable range.

5. The wireless communication device according to claim 4, wherein when the wireless communication device further moves from the first position to a second position, which is out of the communicable range, the controller detects at least one of a direction and a distance between the first position and the second position, and provides information to be used to place the wireless communication device back to the origin point from the second position.

6. The wireless communication device according to claim 3, wherein the controller records a position where data communication has been actually performed and thus normally completed between the wireless communication device and the communication target, as the origin point.

7. A wireless communication device that performs wireless data communication with an external communication target, comprising:
    a controller that:
        detects the number of communication targets that are communicable with the wireless communication device;
        records a position of the wireless communication device as an origin point when at least one communicable communication target is detected;
        determines at least one of a distance and a direction from the origin point to a location of the wireless communication device after moving the wireless communication device; and
        provides guidance information to be used to place the wireless communication device back to the origin point in accordance with at least one of the determined distance or direction, wherein the origin point is updated to a position where the highest number of communicable targets are detected.

8. The wireless communication device according to claim 3, wherein the controller includes an acceleration detecting unit that detects accelerations of at least two axes of the wireless communication device, and detects at least one of the moved distance or direction based on the accelerations detected by the acceleration detecting unit.

9. The wireless communication device according to claim 7, wherein the controller includes an acceleration detecting unit that detects accelerations of at least two axes of the wireless communication device, and detects at least one of the moved distance or direction based on the accelerations detected by the acceleration detecting unit.

10. The wireless communication device according to claim 4, wherein the controller includes an acceleration detecting unit that detects accelerations of at least two axes of the wireless communication device, and detects at least one of the moved distance or direction based on the accelerations detected by the acceleration detecting unit.

11. The wireless communication device according to claim 5, wherein the controller includes an acceleration detecting unit that detects accelerations of at least two axes of the wireless communication device, and detects at least one of the moved distance or direction based on the accelerations detected by the acceleration detecting unit.

12. The wireless communication device according to claim 6, wherein the controller includes an acceleration detecting unit that detects accelerations of at least two axes of the wireless communication device, and detects at least one of the moved distance or direction based on the accelerations detected by the acceleration detecting unit.

13. The wireless communication device according to claim 3, wherein the controller detects both of the moved distance and direction, and provides at least one of the direction and distance from the current position of the wireless communication device to the origin point, as the guidance information.

14. The wireless communication device according to claim 4, wherein the controller detects both of the moved distance and direction, and provides at least one of the direction and distance from the current position of the wireless communication device to the origin point, as the guidance information.

15. The wireless communication device according to claim 5, wherein the controller detects both of the moved distance and direction, and provides at least one of the direction and distance from the current position of the wireless communication device to the origin point, as the guidance information.

16. The wireless communication device according to claim 6, wherein the controller detects both of the moved distance and direction, and provides at least one of the direction and distance from the current position of the wireless communication device to the origin point, as the guidance information.

17. The wireless communication device according to claim 7, wherein the controller detects both of the moved distance and direction, and provides at least one of the direction and distance from the current position of the wireless communication device to the origin point, as the guidance information.

18. The wireless communication device according to claim 3, wherein the origin point is a predetermined area within the communicable range.

19. The method according to claim 1, wherein a position where data communication has actually been performed and that is normally completed between the wireless communication device and the communication target is set as the origin point.

20. The method according to claim 1, wherein the origin point is a position where a highest number of communicable targets are detected.

* * * * *